United States Patent
Alfert

(10) Patent No.: US 12,343,670 B2
(45) Date of Patent: Jul. 1, 2025

(54) METHOD FOR DETERMINING THE ABSOLUTE HUMIDITY AND APPARATUS FOR CARRYING OUT THE METHOD

(71) Applicant: ATEX Explosionsschutz GmbH, Möhnesee (DE)

(72) Inventor: Franz Alfert, Möhnesee (DE)

(73) Assignee: ATEX Explosionsschutz GmbH, Möhnesee (DE)

( * ) Notice: Subject to any disclaimer, the term of this patent is extended or adjusted under 35 U.S.C. 154(b) by 0 days.

(21) Appl. No.: 18/714,006

(22) PCT Filed: Nov. 11, 2022

(86) PCT No.: PCT/DE2022/100842
§ 371 (c)(1),
(2) Date: May 28, 2024

(87) PCT Pub. No.: WO2023/098938
PCT Pub. Date: Jun. 8, 2023

(65) Prior Publication Data
US 2024/0416269 A1    Dec. 19, 2024

(30) Foreign Application Priority Data
Nov. 30, 2021  (DE) .................... 10 2021 131 434.8

(51) Int. Cl.
*B01D 46/24*     (2006.01)
*G01N 1/22*      (2006.01)

(52) U.S. Cl.
CPC ....... *B01D 46/2411* (2013.01); *G01N 1/2247* (2013.01)

(58) Field of Classification Search
CPC ............. B01D 46/2411; G01N 1/2247; G01N 2001/2288

USPC ..................... 73/863.23, 31.07, 29.05, 29.01
See application file for complete search history.

(56) References Cited

U.S. PATENT DOCUMENTS

| 2014/0076027 A1* | 3/2014 | Nicholson | G01N 19/10 73/29.02 |
| 2015/0343363 A1* | 12/2015 | Schlichter | B01D 46/003 55/323 |

FOREIGN PATENT DOCUMENTS

| CN | 201392284 Y | | 1/2010 | |
| CN | 106687193 A | * | 5/2017 | ......... B01D 46/0005 |
| CN | 206235608 U | * | 6/2017 | |
| CN | 109856186 A | * | 6/2019 | |
| CN | 213912735 U | | 8/2021 | |
| DE | 3431624 A1 | | 1/1985 | |

(Continued)

OTHER PUBLICATIONS

International Search Report issued by the European Patent Office in PCT application PCT/DE2022/100842 on Jan. 16, 2023.

*Primary Examiner* — Laura Martin
*Assistant Examiner* — Nashmiya S Fayyaz
(74) *Attorney, Agent, or Firm* — Henry M. Feiereisen LLC

(57) ABSTRACT

A method and a device for determining the absolute humidity of a gas sample of a process gas are disclosed. The process gas is filtered for purification, before the gas sample obtained in this way is directed via a chilled mirror hygrometer. The process gas is withdrawn via an inner tube, which is located in a filter cartridge. The filter cartridge projects into a gas flow of the process gas. The inner tube has openings via which a gas sample that is representative over the length of the filter cartridge can be obtained and which allows for an even backwashing of the filter cartridge.

10 Claims, 3 Drawing Sheets

(56) References Cited

FOREIGN PATENT DOCUMENTS

| | | | |
|---|---|---|---|
| DE | 102010040936 A1 | | 3/2012 |
| DE | 102012017101 A1 | | 5/2014 |
| EP | 4446722 A1 | * | 10/2024 |
| JP | H 0980005 A | | 3/1997 |
| WO | WO-2016148578 A1 | * | 9/2016 ................ G01J 3/44 |

* cited by examiner

METHOD FOR DETERMINING THE ABSOLUTE HUMIDITY AND APPARATUS FOR CARRYING OUT THE METHOD

CROSS-REFERENCES TO RELATED APPLICATIONS

This application is the U.S. National Stage of International Application No. PCT/DE2022/100842, filed Nov. 11, 2022, which designated the United States and has been published as International Publication No. WO 2023/098938 A1 and which claims the priority of German Patent Application, Serial No. 10 2021 131 434.8, filed Nov. 30, 2021, pursuant to 35 U.S.C. 119 (a)-(d).

BACKGROUND OF THE INVENTION

The Invention relates to a method for determining the absolute humidity of a gas sample of a process gas. The invention also relates to an apparatus for carrying out the method.

Measuring the absolute humidity of a process gas is an important value for the control of processes, especially in spray drying. Spray drying belongs to one of the processing methods that require the highest energy input. The quality of the result, for example of dried milk powder, is characterized, i.a., by the residual humidity content. A challenge in controlling a spray dryer is to control the residual humidity in the powder with a minimum amount of energy (hot air) and to prevent the powder from adhering to the walls of the chamber. Maintaining a constant residual moisture content is not easy, as the operation of a spray dryer must be continuously adapted to variations in the feed concentration and ambient air moisture. An unacceptable moisture content not only affects the physical properties and shelf life of the product, but also the processing procedure. Sticking leads to product loss and increased cleaning effort, which in turn costs time and energy. In order to optimize the drying process by controlling the residual humidity content, the operator needs fast, accurate and continuous measurements. In practice, the residual humidity in the powder is determined by one to two-hour offline measurements of product samples, with the time between measurement and reaction being very long. In some cases, sensors are also used to measure the relative humidity in the exhaust air. They are used for online feedback when the process control parameters are changed. These sensors are very susceptible to product buildup, require regular calibration and show inaccuracies due to drift and delays (hysteresis). To avoid product buildup, they are often placed behind the exhaust air filters, where in most cases the exhaust air from the dryer is mixed with the relatively dry exhaust air from a fluidized bed, which can distort the measurement. Furthermore, the relative air moisture is not a very good representation of the process as it varies with temperature and experience has shown that it yields slightly different readings when measured at different points in the same duct.

If a measuring point were to be blocked by product deposits, the facility would have to be shut down. It should hereby be borne in mind that the dust load in the facilities is sometimes so high that a spray drying facility can only be operated for a short period of, for example, two days and must then be shut down and cleaned before the next production cycle commences. In the case of larger drying facilities (throughput rates of above 30 tons of drying mass per hour), for example for drying coconut milk, it takes however a certain amount of time for the facility to start up again. Such a facility runs typically thirty days at a time before the measuring points need to be cleaned. If such a facility were to be shut down every other day for cleaning, production losses would be immense. Facility operators therefore attach great importance to having longest possible maintenance intervals in order to also reduce the amount of cleaning required. For reasons of process reliability, measuring points are therefore not positioned too close to the drying tower.

In addition, it is more precise to determine the absolute humidity of a gas sample of a process gas. For this purpose, a purified gas sample is conducted via a chilled mirror hygrometer. The measuring principle is based on the gas sample being passed over a temperature-controlled polished mirror surface. At a certain temperature-depending on the moisture content of the gas and the operating pressure—the moisture in the gas sample condenses on the surface of the mirror. The condensation is detected by optical systems and the corresponding temperature is recorded as the dew point temperature of the sample gas. The dew point curve allows conclusions to be drawn about the absolute humidity. An essential prerequisite for the operation of chilled mirror hygrometers is that the measurements are not influenced by impurities such as dust or powder particles.

The invention is based on the object to provide a method for determining the absolute humidity of a gas sample of a process gas using a chilled mirror hygrometer, which is suitable for taking a representative sample about the gas flow of the process gas in order to obtain improved measured values in a shorter time, in particular with the objective of being able to better influence the process control with regard to the humidity content of the process gas.

Furthermore, the invention is based on the object to provide an apparatus for carrying out the method.

SUMMARY OF THE INVENTION

The method as set forth hereinafter attains the first part of the object. An apparatus for carrying out the method is also set forth hereinafter.

The respective subclaims set forth advantageous refinements of the invention.

The method according to the invention is based on taking a gas sample of a process gas. The process gas is filtered and then conducted as purified gas sample via a chilled mirror hygrometer. The particular feature is that the process gas is withdrawn via an inner tube, which is located in a filter cartridge, with the filter cartridge in turn projecting into the process gas flow to be tested. The filter cartridge can be introduced into the gas flow at a suitable length, for example over a quarter or half of the cross-section of the gas flow. The filter cartridge protects the inner tube from contamination. The filter cartridge allows the purified gas sample to enter the inside of the filter cartridge and thus the gas sample to be fed to the chilled mirror hygrometer via the inner tube in the filter cartridge.

The filter cartridge is in particular cylindrical. The filter cartridge can have a filter surface over its entire outer surface area, but at least over its cylindrical region. In particular, the filter cartridge involves a slot filter.

Such a filter cartridge, when used in a spray drying process, can be located relatively close to the process event, preferably upstream and not downstream of any exhaust filters for the process gas, so that more reliable measured values can be determined independently of the relatively dry exhaust air from a fluidized bed of the spray drying process. A reliably determined moisture content enables a reduction in energy consumption and contributes to improve product quality. It is particularly useful to measure the absolute humidity of the process gas at the outlet of the dryer. The filter cartridge is therefore preferably located near the outlet of the dryer of a spray drying process, as the genuine values can be displayed directly here.

The specially developed filter cartridges make it possible to withdraw dust-free gas samples even from highly powder-loaded zones of the process. The gas samples are preferably discharged from the inner tube via a heated line. This prevents premature condensation before the gas sample reaches the sensor of the chilled mirror hygrometer.

To ensure that the measurements on the chilled mirror hygrometer are not influenced by contamination such as dust or powder particles, the sensor regularly checks the condition of the mirror surface. At startup, the sensor goes into digital containment control mode (DCC). The surface of the mirror is heated until all condensates on it evaporate. The mirror surface with the remaining contamination particles is then used as a reference. This process can be repeated during the measurements at a user-defined interval. This ensures that current reference values are available at all times and that the operator receives a status message when manual cleaning of the mirror surface is required.

In order to obtain a representative gas sample, the inner tube has in particular several openings arranged along its length, via which the gas sample filtered by the filter cartridge enters a longitudinal channel of the inner tube and from there is fed to the chilled mirror hygrometer. The distribution and size of the openings are selected such that a partial gas sample is obtained from each length region of the inner tube and is then fed as mixture to the chilled mirror hygrometer.

The particular feature of using an inner tube is the combination with a backwash device which is connected to the inner tube. The backwash device is used for backwashing and introduces a purge gas into the inner tube to remove product deposits from an outer side of the filter cartridge. The backwash device fulfills an important function, as it allows the measuring point to be located in regions with high dust load, in particular in immediate vicinity of a drying tower. Measuring points become clogged there very quickly. Efficient and regular backwashing keeps the measuring point open without interrupting production. The design of the measuring point according to the invention, using a filter cartridge with an inner tube that also is used to backwash the filter cartridge, meets the requirement in a particularly beneficial way. On the one hand, gas samples are obtained very reliably across a relevant cross-section. On the other hand, the filter cartridge can be efficiently backwashed via the openings.

The purge gas is conducted into an annular gap between the outer side of the inner tube and the inner side of the filter cartridge via the openings arranged on the circumference of the inner tube. A pressure pulse of the purge gas can regularly and very reliably loosen product deposits from the outer side of the filter cartridge. A further gas sample can then be taken.

In view of the dependence of the dew point on the prevailing pressure, the same gas sample with the same moisture content can condense under different pressure conditions at different temperatures. Therefore, the method according to the invention carries out a pressure compensation in particular. For this purpose, the absolute pressure of the gas is measured at the dew point level and used as compensation to determine that the sample has this dew point at this absolute pressure. This compensates for the effect of the gas intake pressure from the sampling point to the measuring point and the correct moisture content is determined.

It is of advantage when a sufficiently large annular gap is established between the inner tube and the inner side of the filter cartridge so that the purge gas reaches all regions of the filter cartridge evenly and can reliably remove product deposits. In addition, provision may be made to conduct the purge gas from the inner tube towards an end-side closure body of the filter cartridge, with openings in the inner tube adjoining the closure body so that part of the purge gas is deflected from the closure body into the end-side openings. The shape of the closure body therefore influences the flow conditions in the annular gap. In the simplest design, the end-side closure body is a flat cap, with the openings in the inner tube having the shape of circular holes. In this context, it is important that the filter is cleaned evenly over its entire length. Only then can meaningful gas samples be obtained from the relevant cross-section of the process gas.

In an advantageous refinement of the invention, the openings are arranged at an opening spacing from an adjacent opening in the longitudinal direction, which opening spacing is smaller at a first end of the inner tube than at the second end. The second end is the end with the closure body that projects deep into the gas flow. The first end is the borderside end on the wall of the channel through which the process gas is conducted. By adjusting the opening spacings, an even flow of the purge gas into the annular gap can be attained. It is also possible to select and arrange the openings in terms of diameter, number, arrangement and opening spacing in such a way that regions, which, as experience has shown, are more heavily loaded with dust are backwashed more than other longitudinal or circumferential regions of the filter cartridge. Typically, the deposits are greatest at the closed end of the filter cartridge, which protrudes furthest into the media flow, while the deposits decrease towards the side of the housing wall. The opening spacings are therefore selected such that less purge gas is applied to the region adjacent to the housing wall during backwashing than to the highly loaded end-side region of the filter cartridge. It is even possible for the end face of the inner tube to be completely open in order to deflect the purge gas in large quantity coming from the open end and in this way build up a pressure gradient in the annular gap, with the objective of cleaning a highly loaded peripheral region of the filter cartridge with more purge gas, or with purge gas at a higher pressure, than less loaded regions. Ideally, the pressure profile in the annular gap corresponds to the course of the loading with the product from the process gas, so that the product can be rinsed off by one or more pressure surges during backwashing. The filter cartridge cleaned in this way can be used again immediately. The measuring processes can be continued. The production process does not have to be interrupted in any way.

The adaptation of the openings to the desired pressure profile during backwashing also has a positive effect when the flow direction is reversed, i.e. when the gas sample is extracted. When withdrawing the process gas for humidity determination, the purified sample is guided into the interior of the inner tube through the same openings as the purge gas from the inner tube, so that the gas sample represents a representative cross-section of the gas flow.

The inner tube and the filter jacket in the form of a split tube are attached in particular to the end-side closure body and on the other side to an end cap. The end cap has an opening. An adapter tube is connected to the opening. The purge gas is introduced into the opening of the end cap via the adapter tube and from there into the inner tube arranged opposite the opening. The gas sample is withdrawn in the same way. The inner tube starts at the end cap, while the adapter tube is guided out of the end cap away from the filter. The particular feature here is that the inner tube does not have to be adapted to the cross-section of the adapter tube. The inner tube can be adapted to the process conditions of the process in terms of the number, distribution and cross-section of the openings as well as the diameter of the inner tube. The inner tube preferably has a constant diameter. The invention also includes inner tubes with graduated diameters. The inner tube is in particular cylindrical. If need be, it can also be non-circular. Inner tubes with a conical shape are also possible. The decisive function is to take gas samples over different length sections and to enable effective backwashing.

In addition to the above-mentioned method, the invention also relates to an apparatus for carrying out the method, with the apparatus including a filter cartridge designed to filter the process gas for the gas sample. The aforementioned inner tube is located in the filter cartridge and is designed to receive the filtered gas sample via an annular gap between the filter cartridge and the inner tube and to conduct it to the chilled mirror hygrometer.

The gas sample can be fed into a longitudinal channel of the inner tube via the aforementioned openings. At the same time, the longitudinal channel is used via a connection with a backwash device to conduct the purge gas into the inner tube in order to loosen deposits or filter cake from the outer side of the filter cartridge. For a desired pressure profile, the opening spacing of the openings may vary in longitudinal direction of the inner tube, i.e. it may not be selected constant. In particular, the opening spacing at a first end of the filter cartridge is smaller than at the second end of the filter cartridge.

An end-side closure body of the filter cartridge is not used for withdrawal of sample but is preferably gastight. It is used to secure the walls of the filter cartridge, in particular of a metallic slot filter. It is important that a sufficient amount of purge gas discharges in vicinity of the closure body. End-side openings of the inner tube shall therefore preferably adjoin an end-side closure body. End-side openings may be border-side openings which virtually are arranged radially as well as an axial opening in the inner tube at an end face thereof.

A backwash line is connected to the inner tube, with a shut-off valve in gas sample line being closed to protect the chilled mirror hygrometer when the backwash line is open. The entire purging process is controlled in particular by a control unit for the backwash line. This is designed to start the backwash device in dependence on a trigger signal and to control the shut-off valve to the chilled mirror hygrometer such that the purge gas only enters the filter cartridge. The control unit controls in particular other valves in order to release the purge gas or to separate it from the gas sample line when a gas sample is measured. It is possible to connect separate purge lines to the filter cartridge. Purging may be implemented also directly via the gas sample line when the line is designed accordingly.

BRIEF DESCRIPTION OF THE DRAWING

Exemplary embodiments of the invention will be explained in more detail hereinafter with reference to schematic drawings.

It is shown in.

DETAILED DESCRIPTION OF PREFERRED EMBODIMENTS

Figure 3:
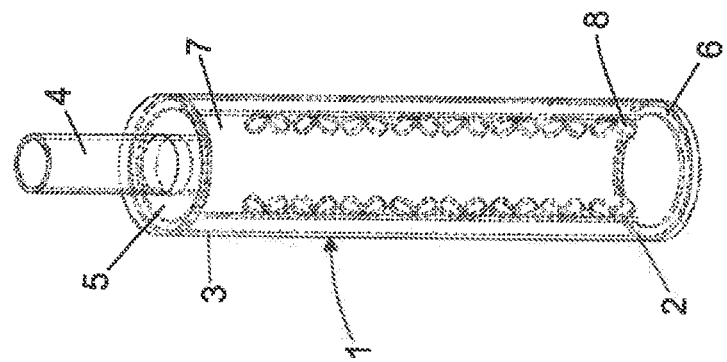
FIG. 3 a perspective view partially in section of a further embodiment of a filter cartridge.

The invention shows a filter cartridge 1 with a cylindrical cross-section with the diameter A of, e.g., 50 to 70 mm, in particular 60 mm. The lower end in the image plane is the first end 2 of the filter cartridge 1. It projects into a gas flow which is not shown in greater detail. The upper end in the image plane is the second end 3. It is attached to a wall of a flow channel. The filter cartridge 1 is connected to a chilled mirror hygrometer (not shown in greater detail) via an adapter tube 4 in fluid-conducting manner for a gas.

The adapter tube 4 has a smaller diameter than the filter cartridge 1. The adapter tube 4 is shorter than the filter cartridge 1. It is attached to a circular disk-shaped end cap 5. The other end 2, which projects freely into the gas flow, also has a disk-shaped closure body 6, so that the filter cartridge 1 has an overall cylindrical cross-section. The internal structure is explained with reference to FIG. 2.

Located in the filter cartridge 1 is an inner tube 7 with several openings 8 which are spaced apart from one another in longitudinal direction and distributed about the circumference and which are arranged at an opening spacing E relative to one another. In this exemplary embodiment, the cylindrical filter cartridge 1 has a length of 240 to 260 mm, with 10 openings being distributed over the length. The diameter of the openings in this exemplary embodiment example is 8 mm. There are four straight rows of openings 8, which are offset by 90° relative to each other in circumferential direction of the filter cartridge 1. From the illustration in FIG. 2, it can be seen that the opening spacing E between the two openings 8 shown at the second end 3 is greater than at the first end 2 of the filter cartridge 1.

The openings 8 at the first end 2 are directly adjacent to the closure body 6, so that a gas that is introduced into the inner tube 7 can escape directly adjacent to the closure body 6. The outgoing gas, the so-called purge gas, can enter an annular gap 9. The annular gap has a cylindrical cross-section, as the filter jacket 10, which surrounds the cylindrical filter cartridge 7, is also cylindrical. The filter jacket is connected to the closure body 6 and the end cap 5. The filter jacket 10 involves a slot filter that functions like a depth filter. The upper end cap 5 is also connected to the closure body 6 via the inner tube 7. The inner tube 7 has an outer diameter F that is greater than the diameter of the adapter tube 4. A width of the annular gap is approximately 10% of the diameter of the filter jacket 10. In a preferred exemplary embodiment, the filter jacket has a length of 245 mm and a diameter of 60 mm. The inner tube 7 is slightly shorter than the filter jacket 10 because the closure body 6 and the end cap 5 are slightly stepped radially inwards and therefore assume a shorter distance between them. Located in the end cap 5 at the second end is an opening 11 into which the adapter tube 4 is inserted.

The perspective view according to FIG. 3 clearly shows that the openings 8 are respectively arranged offset by 90° about the circumference and are arranged in several longitudinal sections spaced apart in longitudinal direction, with four openings of the same diameter D being arranged evenly about the circumference in each longitudinal section. In the exemplary embodiment of FIG. 3, the opening spacing E of all openings is identical in longitudinal direction. However, the nearest openings 8 adjacent to the second end 3 are arranged at a greater distance from the end cap 5 than the openings 8 in the region of the closure body 6.

Figure 4:
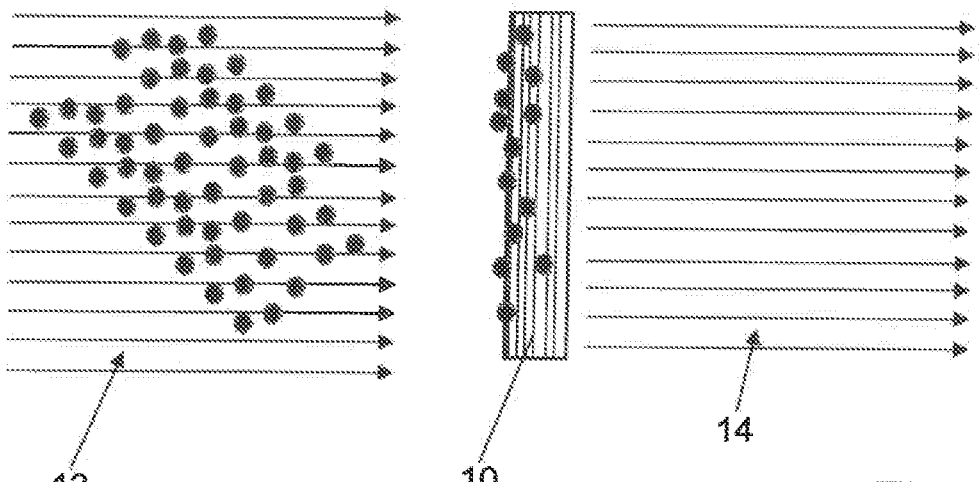
FIG. 4 a schematic illustration of a depth filter.

The inner tube 7 fulfills two functions. On the one hand, it is used to receive filtered process gas, which is fed to the chilled mirror hygrometer as purified gas sample. The purified process gas first passes through the filter jacket 10 into the annular gap 9 and from there via the openings 8 into a central longitudinal channel 12 of the inner tube 7. The gas sample is conducted via the opening 11 and the adapter tube 4 via a gas sample line to the chilled mirror hygrometer. The arrangement of the openings and the length of the filter cartridge 1 make it possible to take a representative gas sample across the cross-section of the flow of the process gas, of which the absolute humidity is to be determined. The process gas is usually loaded with particles, for example in the form of a powder. The filter jacket 10 is in particular . . . a gap filter and as such a so-called depth filter (FIG. 4). In a depth filter, the process gas 13 loaded with powder reaches the filter jacket 10 in the form of a gap filter. On the opposite side, the process gas emerges cleaned of particles. This involves the purified gas sample 14, which is fed to the longitudinal channel 12 of the inner tube 7 for further examination.

Figure 5:
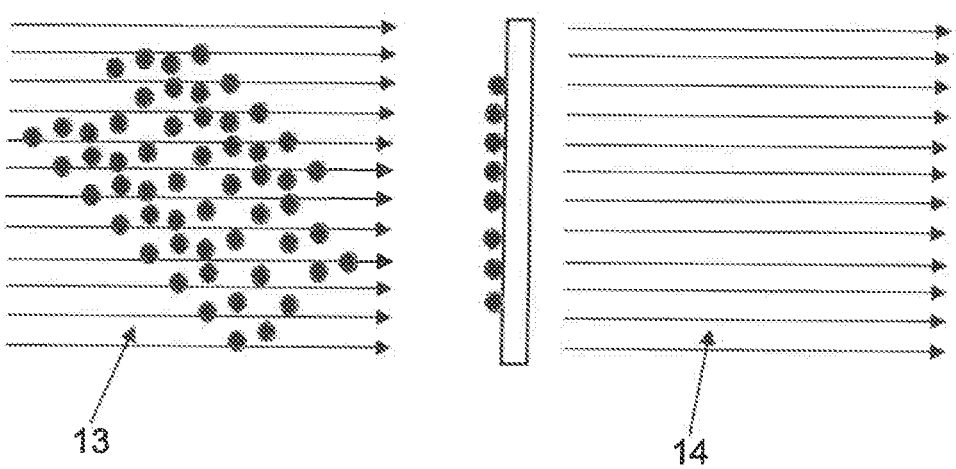
FIG. 5 a schematic illustration of a surface filter.

The separation effect of the depth filter is based, i.a., on the blocking effect. The blocking effect is based on the fact that movements of the center of mass of a particle to be separated pass a filter surface, with the particle still impacting the filter surface as a result of its geometric expansion and adheres through adhesion. As the particle diameter increases, the probability of contact between the particle and the filter surface increases. Ultrafine particles are mainly separated by diffusion, while particles with a diameter greater than 0.5 μm are dominated by the blocking effect and inertia. In contrast to surface filtration (FIG. 5), the particles are separated solely by the filter medium. By narrowing the flow channels as a result of particle separation, the separation effect is improved with a simultaneous increase in pressure loss. The deposition of particles on the surface of the filter medium in the form of a filter cake is undesirable in depth filtration, as this makes it more difficult for subsequent particles to enter the filter medium and can lead to locally increased pressure losses. When using slot filters, it is therefore particularly important to clean the filters regularly or to backwash them in accordance with the invention. By designing the inner tube or the size of the annular space and the arrangement of the openings to suit the requirements, defined pressure ratios can be adjusted in the annular gap 9 in order to effectively remove particle deposits using one or more pressure surges with purge gas.

Figure 2:
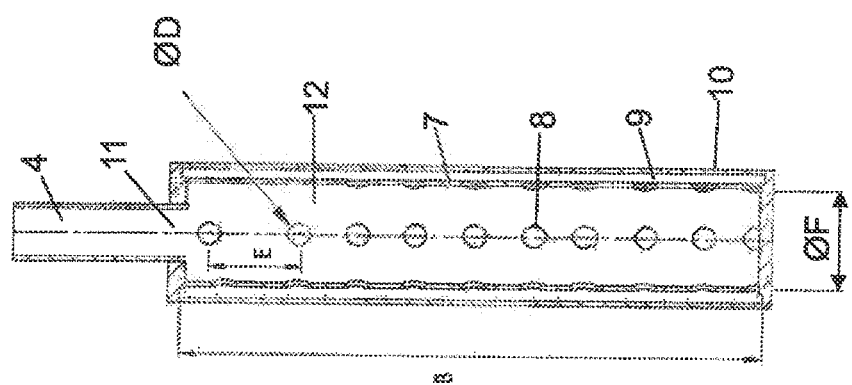
FIG. 2 a longitudinal section of the filter cartridge of FIG. 1.
Figure 1:
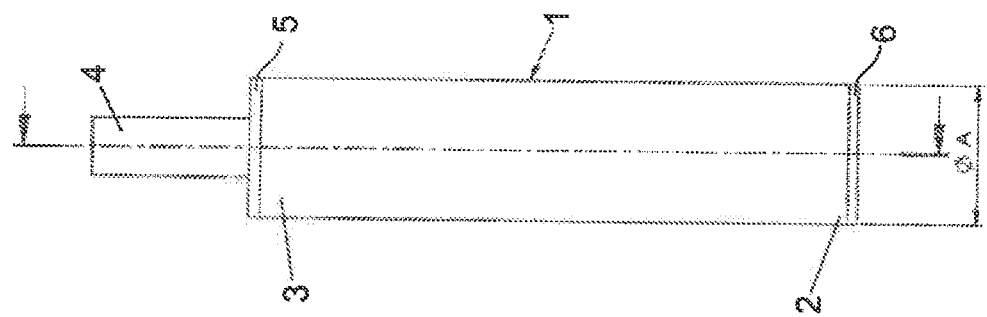
FIG. 1 a side view of a filter cartridge.
Figure 6:
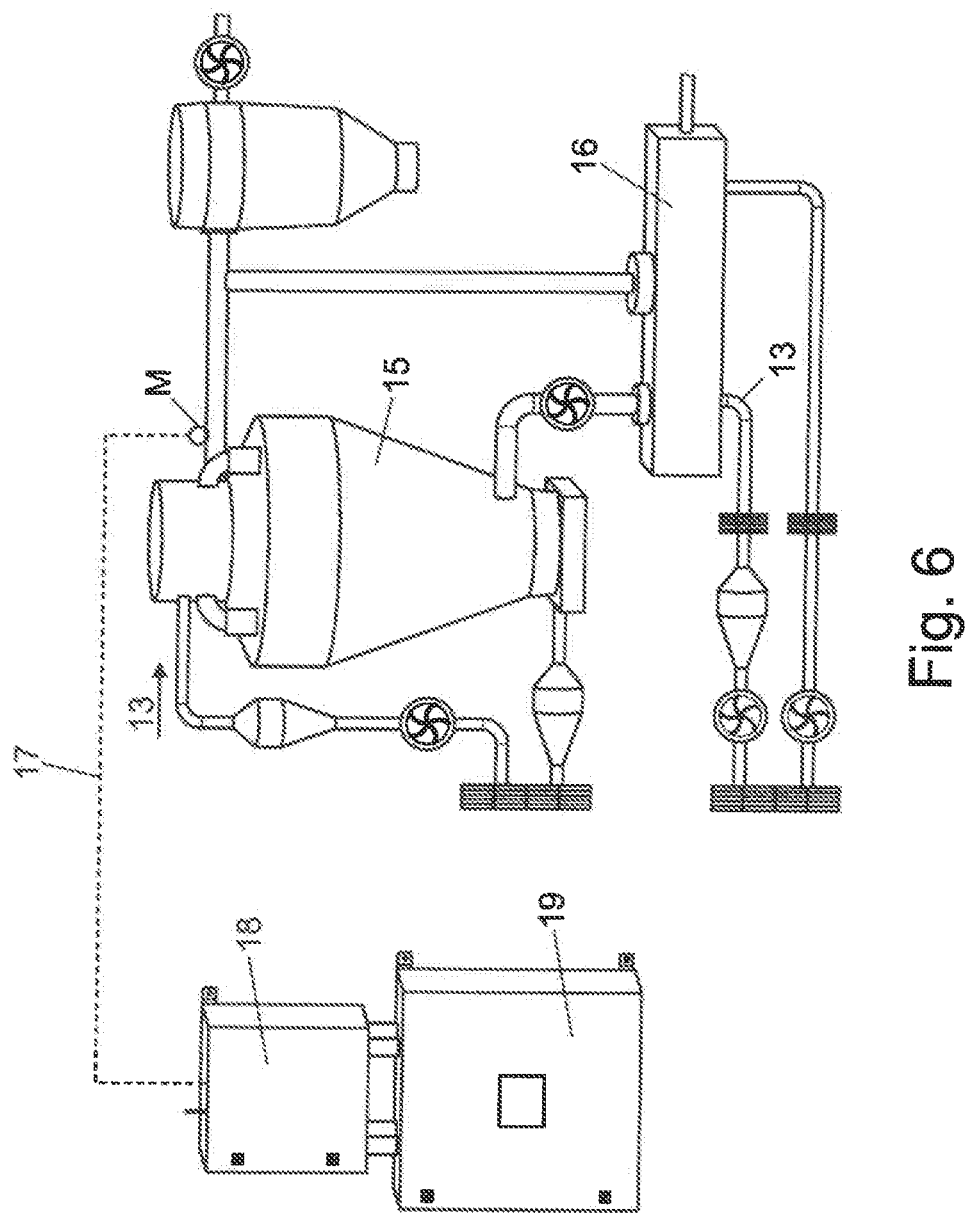
FIG. 6 a schematic illustration of an apparatus for determining the absolute humidity.

FIG. 6 shows a possible application for such a filter cartridge. A spray drying facility is shown purely schematically. A liquid to be dried, for example, milk powder, is introduced into a drying tower 15 and dried by a process gas 13 in the form of hot air. The milk powder is subsequently dried further in a fluidized bed 16. Hot air 13 is also supplied as process gas for this purpose. Provision is made in the Invention for a measuring point M in immediate vicinity of the drying tower 15. The filter cartridge is arranged here, as shown in FIGS. 1 to 3. Via a heated gas sample line 17, the gas sample is fed to a chilled mirror hygrometer 18, shown purely schematically, by which the absolute humidity of the gas sample 14 is determined. The measuring process is controlled by a control unit 19. This control unit also serves as a backwash of the filter cartridge 1 by guiding air as purge gas through the adapter tube 4 into the inner tube 7 and via the annular gap 9 to the inside of the filter jacket 10. Particle deposits on the outside are thereby loosened from the filter jacket 10 and the filter jacket is cleaned. Backwashing takes place in dependence on a trigger signal, for example time-controlled.

The invention claimed is:

1. A method, comprising:
conducting a process gas through a filter cartridge having a filter jacket which surrounds the filter cartridge, with the filter jacket functioning as a depth filter for purification of the process gas passing through the filter jacket to obtain a purified gas sample;
withdrawing the process gas via an inner tube located in the filter cartridge, with the filter cartridge projecting into a gas flow of the process gas;
conducting the purified gas sample via a gas sample line from the inner tube to a chilled mirror hygrometer, external from the filter cartridge, for determining an absolute humidity of the gas sample of the process gas;
connecting a backwash device to the inner tube;
introducing a purge gas into the inner tube for backwashing in order to remove particle deposits from an outer side of the filter cartridge; and
conducting the purge gas via a plurality of openings, arranged on a circumference of the inner tube, into an annular gap between an outer side of the inner tube and an inner side of the filter cartridge, with the openings being arranged at an opening spacing from an adjacent opening in a longitudinal direction, wherein the opening spacing is smaller at a first end of the inner tube than at a second end of the inner tube, so that more purge gas is conducted out of the inner tube in a region of the first end than in a region of the second end of the inner tube, with the first end projecting deeper into the gas flow of the process gas than the second end.

2. The method of claim 1, wherein the plurality of openings are arranged over a length of the inner tube, via which openings the gas sample filtered by the filter cartridge enters into a longitudinal channel of the inner tube and from there is fed to the chilled mirror hygrometer.

3. The method of claim 1, wherein the purge gas is conducted from the inner tube against an end-side closure body of the filter cartridge, with end-side openings of the plurality of openings in the inner tube adjoining the closure body, so that part of the purge gas is deflected from the closure body into the end-side openings.

4. The method of claim 1, wherein, when the process gas is withdrawn for humidity determination, the purified gas sample enters the inner tube via same ones of the plurality of openings as the purge gas from the inner tube, so that the gas sample is withdrawn via a representative cross-section of the gas flow in which the filter cartridge is located.

5. The method of claim 3, wherein the inner tube is located in the filter jacket, the method further comprising attaching the inner tube and the filter jacket to the end-side closure body and to an end cap, with the end cap including an opening and an adapter tube connected to the opening of the end cap, with the purge gas being introduced via the adapter tube and the opening of the end cap into the opposite inner tube.

6. Apparatus for determining absolute humidity, the apparatus comprising:
a filter cartridge having a filter jacket which surrounds the filter cartridge, with the filter jacket functioning as a depth filter to filter a process gas passing through the filter jacket to obtain a gas sample;

an inner tube located in the filter cartridge and designed to receive the gas sample via an annular gap between the filter jacket of the filter cartridge and the inner tube, said inner tube including a plurality of openings distributed over a length of the inner tube for introducing the gas sample into a longitudinal channel of the inner tube, wherein the openings are each arranged at an opening spacing from an adjacent one of the openings in a longitudinal direction of the inner tube, with the opening spacing at a first end of the inner tube being smaller than at a second end of the inner tube;

a chilled mirror hygrometer, external from the filter cartridge, for determining the absolute humidity of the gas sample; and and a gas sample line conducting the gas sample from the inner tube to the chilled mirror hygrometer.

7. The apparatus of claim 6, further comprising a backwash device connected to the inner tube and designed to conduct a purge gas into the inner tube in order to remove particle deposits from an outer side of the filter cartridge.

8. The apparatus of claim 6, wherein openings of the plurality of openings of the inner tube in adjacent relationship to the first end adjoin an end-side closure body of the filter cartridge.

9. The apparatus of claim 7, further comprising:
a backwash line connected to the inner tube; and
a shut-off valve arranged in a gas sample line and being closed when the backwash line is open in order to protect the chilled mirror hygrometer.

10. The apparatus of claim 9, further comprising a control unit operably connected to the backwash device and designed to start the backwash device in dependence on a trigger signal and to control the shut-off valve in such a way that only the filter cartridge is purged.

\* \* \* \* \*